United States Patent [19]

Wu et al.

[11] 3,873,643

[45] Mar. 25, 1975

[54] GRAFT COPOLYMERS OF POLYOLEFINS AND CYCLIC ACID AND ACID ANHYDRIDE MONOMERS

[75] Inventors: William C. L. Wu, Arlington Heights; Lawrence J. Krebaum, Palatine; John Machonis, Jr., Schaumburg, all of Ill.

[73] Assignee: Chemplex Company, Rolling Meadows, Ill.

[22] Filed: Dec. 18, 1972

[21] Appl. No.: 316,230

[52] U.S. Cl............ 260/878 R, 260/889, 260/897 A
[51] Int. Cl. ............................................. C08f 15/00
[58] Field of Search ................... 260/878 R, 78.4 D

[56] References Cited
UNITED STATES PATENTS 3,205,185  9/1965  Lessells et al................. 260/78.4 D
3,236,917  2/1966  Natta et al...................... 260/878 R
3,654,203  4/1972  Daimer et al.................. 260/78.4 D
3,766,135  10/1973 Yamanouchi et al........... 260/878 R Primary Examiner—Joseph L. Schofer
Assistant Examiner—A. Holler
Attorney, Agent, or Firm—Hofgren, Wegner, Allen, Stellman & McCord

[57] ABSTRACT

Compositions of matter comprising graft copolymers of a polyolefin and at least one monomer of the class of polymerizable cyclic or polycyclic ethylenically unsaturated acids or acid anhydrides. The resulting copolymers exhibit superior performance in composites, blends and chemically reacted derivative products when compared with unmodified polyolefins and polyolefins grafted with other monomers.

15 Claims, No Drawings

GRAFT COPOLYMERS OF POLYOLEFINS AND CYCLIC ACID AND ACID ANHYDRIDE MONOMERS

BACKGROUND OF THE INVENTION

It is generally known that polyolefins are not compatible with most common fillers or other polymers and are not amenable to modification by such chemical reagents which readily modify other polymers. Fillers have been treated to alter their surface properties and very reactive reagents have been devised which are compatible with and do react with polyolefins but such modified fillers and reagents are expensive and the improvements obtained thereby have been limited. Alternately, polyolefins have been modified by grafting actively polymerizable olefinically unsaturated acids, esters and anhydrides and again results have been unsatisfactory in one or more of the following ways:

Sometimes dilute solution graft techniques were required which were tedious, expensive or wasteful of monomers and solvents.

Melt graft techniques with active monomers gave products containing ungrafted homopolymers and which were heterogeneous, thus having poor tensile properties with or without fillers.

Many melt graft products had such low melt indexes as to be unprocessable.

Many graft products appeared to consist of long chains of grafted polar monomers on non-polar polyolefin backbones. Such products separated into polar and non-polar domains which resulted in inferior or only marginally improved properties of the neat or filled products.

SUMMARY OF THE INVENTION

We have found that by grafting acids and anhydrides which are cyclic and preferably bridged and/or polycyclic and wherein the olefinic unsaturation is so situated and substituted as to allow only a slow rate of polymerization, the resulting copolymers of this invention have reactive functionality for post-reactions, contain little or no homopolymer of the acid or anhydride, appear to contain only short grafted monomer chains which do not separate into polar and non-polar domains whether neat or compounded, have high melt indexes and, therefore, are readily processed and have excellent tensile properties whether neat or compounded.

DESCRIPTION OF THE PREFERRED EMBODIMENTS

According to this invention, there are provided copolymers comprising polyolefins which are modified by grafted cyclic unsaturated acid or acid anhydride monomers or both and which exhibit improved compatibility with other materials and which are chemically reactive.

By polyolefins, it is meant polymers and copolymers of ethylene, propylene, butenes and other unsaturated aliphatic hydrocarbons. Especially preferable in this invention are ethylene homopolymers prepared by either the low pressure or high pressure methods (linear or high density polyethylenes and branched or low density polyethylenes, respectively) and such copolymers of ethylene with up to 40 weight percent of such higher olefins as propylene, 1-butene and 1-hexene and which may contain up to 5% of such di- or triolefins which are used commercially in ethylene-propylene terpolymers such as ethylidene-norbornene, methylenenorbornene, 1,4-hexadiene and vinylnorbornene. Also, it is preferable sometimes to graft to blends of two or more of the above homopolymers, copolymers and terpolymers. Whereas, the above polymers represent the preferred embodiments of our invention they should not be regarded as limiting the invention in any way.

By cyclic and polycyclic unsaturated acids and anhydrides, it is meant compounds which contain one or more carboxylic and/or heterocyclic moieties not including the anhydride ring. The rings may be simple, fused, bridged, spiro, joined directly, joined through aliphatic chains containing one or more carbon, oxygen or sulfur atoms, or combinations of the above ring arrangements. These classes are represented respectively by the following structures which are meant to be illustrative rather than limiting:

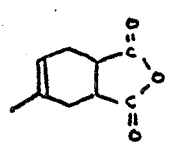

simple 4-methyl cyclohex-4-ene
1,2-dicarboxylic acid anhydride
(4-MTHPA)

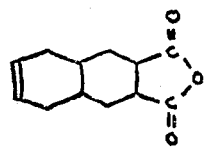

fused 1,2,3,4,5,8,9,10-octahydro
naphthalene-2,3-dicarboxylic
acid anhydride

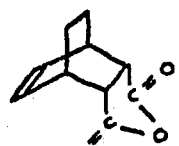

bridged bicyclo[2.2.2]oct-5-ene-
2,3-dicarboxylic acid anhydride
(BODA)

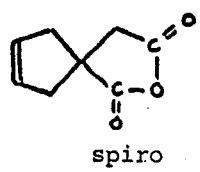

spiro 2-oxa-1,3-diketospiro[4,4]non-
7-ene

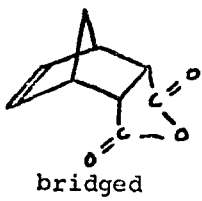

bridged bicyclo[2.2.1]hept-5-ene-2,3-
dicarboxylic acid anhydride
(NBDA)

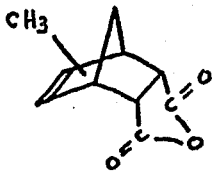

bridged, mixtures of isomers x-methyl bicyclo[2.2.1]hept-5-
ene-2,3-dicarboxylic acid
anhydride (XMNA)

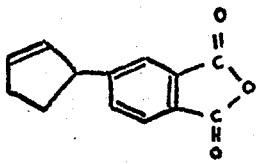

joined directly and aromatic 4-(2-cyclopentenyl)-benzene 1,2-
dicarboxylic acid anhydride

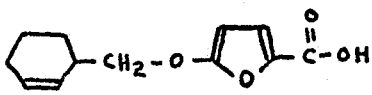

joined thru an aliphatic chain
and heterocyclic 5-(2-cyclohexenyl methyloxy)-
2-furoic acid

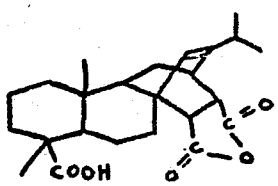

both fused and bridged rings maleo-pimaric acid (M-PA)

Rings may contain 3, 4, 5, 6, 7 or 8 atoms but generally 5 and 6 membered rings are preferred. The monomer may contain aromatic rings but at least one ring should be aliphatic. The olefinic bond is preferably unconjugated with the acid or anhydride groups. Such conjugated monomers as acrylic acid, methacrylic acid, itaconic anhydride and fumaric acid polymerize too fast for the successful practice of this invention. If, however, the olefinic bond is conjugated but otherwise deactivated as by alkyl substitution, the monomer can be used in this application. A non-limiting example of such a conjugated but deactivated monomer is cyclohex-1-ene-1,2-dicarboxylic anhydride.

The method in general consists of heating a mixture of the polymer and the monomer in a solvent or above the melting point of the polyethylene with or without a catalyst. Thus, the grafting occurs in the presence of air, hydroperoxides, other free radical catalysts or in the essential absence of these materials where the mixture is maintained at elevated temperatures and (if no solvent is used) preferably under high shear.

In making the graft copolymers of this invention, the mixture of polyolefin or polyolefins and monomer or monomers is heated in a solvent or above the melting point of the polyolefin at reaction temperatures and under reacting conditions described below and thereafter the resulting graft copolymer is recovered. The term "recovered" means any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

The reaction may be brought about merely by heating the mixture or by heating in the presence of air, free radical catalysts such as hydroperoxides or by heating in the absence of a catalyst and/or under high shear conditions. Any of the commonly known hydroperoxides which have a half life of at least 1 minute at 145°C. may be used in the method of this invention. Such hydroperoxides have the general formula R—O—OH, wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which catalyzes the reaction between polyolefin and monomer to form the graft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130°C., and it is preferred to use the temperatures ranging from about 200° to about 360°C. Temperatures substantially above about 360°C. are generally to be avoided in order to avoid substantial decomposition of the polymeric ingredients. However, if the decomposition products are not undesirable in the product, as in the production of high melt index waxes, higher temperatures may be employed. The reaction time required is quite short, being of the magnitude of from a few seconds to about twenty minutes, although extended heating times do not substantially affect the product and may be employed when desired.

A convenient method of accomplishing the reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some crosslinking at elevated temperatures, it is desirable to carry out the reaction in a closed reaction vessel. A conventional single or multiple screw extruder accomplishes this result without the use of auxiliary equipment and for this reason is a particularly desirable reaction vessel, although it is by no means necessary.

The resulting copolymers of this invention are found to consist of about 70–99.95 weight percent of polyolefin and about 0.05–30 weight percent of the cyclic unsaturated acid or acid anhydride or mixtures and these resulting graft copolymers are capable of blending or reacting with a wide variety of other materials to modify the copolymer further.

The polyolefin used in making the graft polymers of this invention may comprise a polyethylene homopolymer with a density of at least about 0.910 – 0.965 and may be either essentially linear or branched. Where linear, the density is preferably at least about 0.940 and where branched has a density preferably of at least about 0.910 – 0.930.

The polyolefin may also comprise a terpolymer such as one of ethylene, propylene and up to about 5 weight percent of a cyclic or acyclic aliphatic diene or mixtures thereof.

Excellent monomers in the graft copolymer of this invention include 4-methylcyclohex-4-ene-1,2-dicarboxylic acid anhydride, tetrahydrophthalic anhydride, x-methylnorborn-5-ene-2, 3-dicarboxylic anhydride, norborn-5-ene-2,3-dicarboxylic anhydride, 2-cyclopentenyl acetic acid, abietic acid, maleo-pimaric acid and bicyclo[2.2.2]oct-5-ene-2,3-dicarboxylic anhydride.

The following examples illustrate the graft copolymers of the invention and the methods by which they are made.

EXAMPLE 1

An electrically heated C. W. Brabender, Inc. mixing head was modified so that it could hold pressure. To this reactor was charged a mixture of 8.36 parts of NBDA, 0.68 parts of t-butyl hydroperoxide (TBHP) and 90.96 parts of a high density polyethylene powder having an HLMI of 7. The reactor was closed, purged with nitrogen and vacuumed until free of oxygen and heated to 260°C. After reaching 160°C., agitation was started at 160 RPM. After 15 minutes at 260°C. and 160 RPM, the mixture was cooled, quenched in cold hexane, dissolved in trichlorobenzene at 130°C., precipitated in cold methylethylketone and dried at 95°C. and 0.2 mm. mercury absolute pressure overnight. The product contained 1.68 weight percent NBDA by elemental analysis. The HLMI of the product was 0.11. For higher MI products, a higher shear reactor can be used as shown in the following Examples 2 thru 20.

EXAMPLE 2

The same equipment as in Example 1 was charged with 8.36 parts of NBDA and 91.64 parts of the polyethylene of Example 1. The conditions now were 300°–310°C. at 275 RPM for 15 minutes in an oxygen-free atmosphere. The product, after recovery in the same manner, contained 4.75 weight percent NBDA by elemental analysis and the HLMI was 1.83. Thus, at the higher temperature and RPM, graft level and HLMI are higher.

EXAMPLES 3 (COMPARATIVE) AND 4

Under the same conditions as Example 2, except that the reaction times were only 5 minutes, maleic anhydride (MA) and XMNA were grafted to a polyethylene of HLMI = 7 with the results shown in Table I.

Table I

| Example No. | Anhydride | Wt. % Anhydride Charged | Wt. % Grafted Anhydride | Product HLMI |
|---|---|---|---|---|
| 3 | MA | 5.00 | 2.62 | 1.50 |
| 4 | XMNA | 9.08 | 1.56 | 12.08 |

The product of XMNA grafting is clearly more processable than the product of MA grafting. When MA was reacted for 15 minutes as in Example 2, the product HLMI was too low to measure.

EXAMPLES 5 THRU 10

Under the same conditions and in the same equipment as in Example 2, a wide variety of cyclic and polycyclic anhydrides and acids were grafted to polyethylene with the results shown in Table II. In all cases, the HLMIs of the graft polymer product were higher than the starting polyethylene.

Table II

| Ex. No. | Acidic or Anhydride Monomer | Wt. % Anhydride Charged[1] | Wt. % Grafted Anhydride[2] | Product HLMI |
|---|---|---|---|---|
| 5 | XMNA | 9.08 | 3.01 | 8.26 |
| 6 | 4-MTHPA | 8.47 | 1.11 | 20.38 |
| 7 | BODA | 9.08 | 3.98 | 9.01 |
| 8 | CPAA | 6.44 | 2.72 | 13.62 |
| 9 | Abietic acid | 15.42 | 1.98 | 12.68 |
| 10 | Maleo-pimaric acid | 20.42 | 2.34 | 10.57 |

[1] Amounts charged are equimolar and equivalent to 5.0 weight percent MA.
[2] After solution and precipitation as in Example 1 to remove monomers and ungrafted homopolymers.

EXAMPLE 11

A mixture of 15 pounds tetrahydrophthalic anhydride (THPA) and 150 pounds of high density polyethylene (7 HLMI) is prepared by spraying an acetone solution of THPA onto the high density polyethylene powder of Example 1 followed by evaporation of the solvent. This mixture is fed to a corotating twin-screw extruder equipped with five heating zones. The feed rate is about 50 pounds per hour (pph) and the screw speed is 300 RPM. The temperature profile is Zone 1 = 200°C., Zone 2 = 270°C., Zone 3 = 320°C., Zone 4 = 270°C., Zone 5 = 230°C., and die temperature = 180°C. To Zone 2 is added a mixture of catalyst (TBHP) and solvent (o-dichlorobenzene, ODCB) at a rate of about 0.3 pph TBHP and 3.1 pph ODCB. The reaction mixture is devolatilized at Zone 4.

The properties of the resulting polyethylene/THPA graft copolymer are shown below:

| | |
|---|---|
| Percent THPA incorporation | 0.5 |
| Melt index | 0.24 |
| Tensile yield, psi | 4560 |
| Tensile break, psi | 3290 |
| Elongation, percent | 850 |

A blend of the above graft copoymers with 40 weight percent $TiO_2$ was prepared. As a control, a blend of high density polyethylene with about the same melt index as the graft copolymers is blended with 40 weight percent $TiO_2$. Properties of plaques of the two blends are shown below:

| | THPA Graft Copolymer | HDPE Control |
|---|---|---|
| MI | 0.24 | 0.12 |
| Filler | $TiO_2$ | $TiO_2$ |
| Weight percent of filler | 40 | 40 |
| Tensile yield, psi | 4680 | 4260 |
| Tensile break, psi | 2650 | 4260 |
| Elongation, percent | 150 | <10 |

As shown by the table, plaques prepared from the graft copolymer have good tensile properties whereas the control is brittle.

EXAMPLE 12

A mixture of 15 pounds NBDA and 150 pounds high density polyethylene (7 HLMI) is prepared by spraying an acetone solution of NBDA onto the high density polyethylene powder of Example 1 followed by evaporation of the solvent. This mixture is fed to a corotating twin-screw extruder equipped with five heating zones. The temperature profile is Zone 1 = 200°C., Zone 2 = 270°C., Zone 3 = 320°C., Zone 4 = 270°C., Zone 5 = 230°C. and die temperature = 180°C. To Zone 2 is added about 0.4 pph TBHP and 4.7 pph ODCB. The reaction mixture is devolatilized at Zone 4.

The properties of the resulting polyethylene/NBDA graft copolymer are shown below:

| | |
|---|---|
| Percent NBDA incorporation | 3.3 |
| Melt index | 0.16 |
| Tensile yield, psi | 4030 |
| Tensile break, psi | 2630 |
| Elongation, percent | 400 |

A blend of the above graft copolymer with 40 weight percent $TiO_2$ is prepared. Properties of plaques of the above blend and the graft copolymer are compared below:

| | NBDA Graft Copolymer | Filled Graft Copolymer |
|---|---|---|
| Filler | None | $TiO_2$ |
| Weight percent filler | None | 40 |
| Tensile yield, psi | 4030 | 4350 |
| Tensile break, psi | 2630 | 2920 |
| Elongation, percent | 400 | 550 |

As shown by the table, the graft copolymer has the ability to take a high loading of filler with no sacrifice in tensile properties.

EXAMPLE 13

High density polyethylene (7 HLMI) is fed to a corotating twin-screw extruder equipped with five heating zones. The feed rate is about 50 pph and the screw speed is 225 RPM. The temperature profile is Zone 1 = 200°C., Zone 2 = 270°C., Zone 3 = 320°C., Zone 4 = 270°C., Zone 5 = 230°C. and die temperature = 180°C. To Zone 2 is added a mixture of XMNA and t-butylhydroperoxide (TBHP) at a rate of about 6 pph XMNA and 0.3 pph TBHP. The reaction mixture is devolatilized at Zone 4.

The properties of the resulting polyethylene/XMNA graft copolymer are shown below:

| | |
|---|---|
| Percent XMNA incorporation | 1.8 |
| Melt index | 0.28 |
| Tensile yield, psi | 4090 |
| Tensile break, psi | 2560 |
| Elongation, percent | 1020 |

A blend of the above graft copolymer with 40 weight percent $TiO_2$ is prepared. Properties of plaques of the above blend and the graft copolymer are compared below:

| | XMNA Graft Copolymer | Filled Graft Copolymer |
|---|---|---|
| Filler | None | $TiO_2$ |
| Weight percent filler | None | 40 |
| Tensile yield, psi | 4090 | 4220 |
| Tensile break, psi | 2560 | 3460 |
| Elongation, percent | 1020 | 850 |

As shown by the table, the graft copolymer has the ability to take a high loading of filler and maintain good tensile properties.

EXAMPLES 14 THRU 16

High density polyethylene (7 HLMI) and the anhydrides listed in Table III are fed as dry blends to a corotating twin-screw extruder equipped with five heating zones. The feed rates are 50 pph of resin and 5 pph of anhydride. One percent by weight of TBHP catalyst as a 10% solution in ODCB is fed into Zone 2. The screw speed is 300 RPM. The temperature profile is Zone 1 = 200°C., Zone 2 = 270°C., Zone 3 = 320°C., Zone 4 = 270°C., Zone 5 = 230°C. and die temperature = 180°C. The reaction mixture is devolatilized at Zone 4. Blends of the above graft copolymers with 40 weight percent $TiO_2$ are prepared. Properties of plaques of the blends are compared in Table III.

Table III

| Example No. | Monomer | Tensile Values of 40% $TiO_2$ Blends | | |
|---|---|---|---|---|
| | | Yield, psi | Break, psi | Elongation % |
| 14 | MA | 4210 | 4210 | <12 |
| 15 | THPA | 4680 | 2650 | 150 |
| 16 | NBDA | 4350 | 2920 | 550 |

Thus, in comparing the elongations of blends with high filler loading, the bicyclic anhydride is clearly better than the monocyclic anhydride which in turn is better than the acyclic anhydride.

EXAMPLE 17

High density polyethylene (7 HLMI) and 3.6 weight percent XMNA were grafted under the same conditions as Example 13 except that no catalyst was used. A blend of the graft copolymer with 15 weight percent FYBEX (E. I. DuPont de Nemours Company trademark for fibrous crystals of potassium titanate used for reinforcing plastics) was prepared. Properties of plaques of the graft copolymer and the above blend are compared with 0.8 MI HDPE and a 15% FYBEX blend thereof in Table IV below.

Table IV

| Resin | Resin M.I. | Tensile Properties | | | | | |
|---|---|---|---|---|---|---|---|
| | | Unfilled Resin | | | 15% FYBEX Blend | | |
| | | Yield, psi | Break, psi | Elong. % | Yield, psi | Break, psi | Elong. % |
| HDPE | 0.8 | 4670 | 3100 | 1090 | 4700 | 4700 | 10 |
| XMNA Graft Copolymer | 1.2 | 4120 | 2440 | 800 | 5040 | 3050 | 110 |

Thus, the graft copolymer has reinforcing capability with FYBEX whereas standard HDPE becomes brittle at the same filler loading.

The same resins were blended with 15 weight percent and 30 weight percent of NUSHEEN (Freeport Kaolin Company trademark for untreated kaolin clay that is largely aluminum silicate) clay and the properties of plaques of the blends are compared in Table V.

Table V

| Resin | Tensile Properties | | | | | |
|---|---|---|---|---|---|---|
| | 15% Clay | | | 30% Clay | | |
| | Yield, psi | Break, psi | Elong. % | Yield, psi | Break, psi | Elong. % |
| HDPE | 4550 | 4550 | 10 | 3970 | 3970 | <10 |
| XMNA Graft Copolymer | 4470 | 2800 | 190 | 4760 | 3310 | 44 |

A similar trend of yield strength increase (indicating reinforcement) with retention of elongation is evident.

Additionally, the product resin was blended with 20 weight percent each of cellulose fibers (Buckeye Cellulose Corp. P-500 Cotton Linter Pulp), asbestos (Carey-Canadian Mines, Ltd., 7RF-9 Chrystile) and silica (SCM Corporation Silicron G-100). As controls, the same unmodified HDPE resin and the MA grafted resin from comparative Example 14 were blended with the same fillers in the same way. The composites were compression molded into ⅛ × ½ × 4 inches and 1/16 × ½ × 4 inches bars and bent 180° in both directions until the bar broke or 50 bends, whichever is less. Recorded below are the number of bends completed before the bars broke.

| Resin | Number of Bends Required to Break Bar | | | | | |
|---|---|---|---|---|---|---|
| | 20% Cellulose | | 20% Asbestos | | 20% Silica | |
| | ⅛" | 1/16" | ⅛" | 1/16" | ⅛" | 1/16" |
| HDPE | 0 | 11 | 0 | 1 | 0 | 8 |
| MA Graft Copolymer | 2 | 11 | 0 | 7 | 0 | 5 |
| XMNA Graft Copolymer | 6 | 21 | 2 | 14 | 26 | >50 |

Thus, the improvement in filler loading achieved by grafting MA to HDPE is marginal but a significant improvement results from grafting XMNA to the same polyethylene backbone.

EXAMPLE 18

The fact that LDPE is usable in this invention is shown by the following example:

Low density polyethylene (MI = 3.6, d = 0.918) and 3.5 weight percent XMNA were grafted under the same conditions as Example 13. The product contained 0.8% grafted XMNA and was easily loaded with inorganic fillers as shown by the following Table VI.

Table VI

| Resin | Tensile Properties | | | | | | | | |
|---|---|---|---|---|---|---|---|---|---|
| | Unfilled Resin | | | 40% TiO$_2$ | | | 30% Clay | | |
| | Yield, psi | Break, psi | Elong. % | Yield, psi | Break, psi | Elong. % | Yield, psi | Break, psi | Elong. % |
| LDPE | 1590 | 1680 | 550 | 1690 | 1320 | 110 | 1930 | 1590 | 70 |
| XMNA Graft Copolymer | 1560 | 1730 | 460 | 1840 | 1930 | 260 | 2090 | 1990 | 100 |

EXAMPLE 19

An ethylene-propylene-cyclic diene terpolymer, Nordel 1500 (E. I. DuPont de Nemours and Company) and 9.0 weight percent XMNA were grafted under the same conditions of Example 17. The product contained 1.8% grafted XMNA and was easily filled with inorganic fillers to give readily processable blends. Thus, EPDM elastomers can be used in this invention.

EXAMPLE 20

A blend of 80 weight percent HDPE (HLMI = 7) and 20 weight percent of Nordel 1500 was grafted with 8.8 weight percent XMNA under the same conditions as Example 17. The product contained 2.2 weight percent grafted XMNA and had a melt index of 1.4. Thus, blends of polyolefins can be used in this invention.

All parts and percentages herein are by weight.

A summarizing list of the abbreviations used herein to identify chemical ingredients is as follows:

BODA - bicyclo[2.2.2]oct-5-ene-2,3-dicarboxylic acid anhydride
CPAA - 2-cyclopentenyl acetic acid
EPDM - ethylene-propylene-diene terpolymer
4-MTHPA - 4-methyl cyclohex-4-ene-1,2-dicarboxylic acid anhydride
HDPE - high density polyethylene LDPE - low density polyethylene
MA - maleic anhydride M-PA - maleo-pimaric acid
NBDA - bicyclo[2.2.1]hept-5-ene-2,3-dicarboxylic acid anhydride
ODCB - o-dichlorobenzene
TBHP - t-butyl-hydroperoxide
THPA - tetrahydrophthalic anhydride
XMNA - x-methyl bicyclo[2.2.1]hept-5-ene-2,3-dicarboxylic acid anhydride Having described our invention as related to the embodiments set out herein, it is our intention that the invention be not limited by any of the details of description, unless otherwise specified, but rather be construed broadly within its spirit and scope as set out in the appended claims.

We claim:

1. A graft copolymer of about 70–99.95 weight percent of a polyethylene polymer and about 30–0.05 weight percent of at least one monomer selected from the group consisting of polymerizable cyclic ethylenically unsaturated carboxylic acids and carboxylic acid anhydrides.

2. A graft copolymer of about 70–99.95 weight percent of a polyethylene polymer with a density of about 0.910–0.965 and about 30–0.05 weight percent of at least one monomer selected from the group consisting of polymerizable cyclic ethylenically unsaturated carboxylic acids and carboxylic acid anhydrides.

3. A graft copolymer of about 70–99.95 weight percent of a linear copolymer of at least 60% ethylene and up to 40% of an alpha olefin containing 4 to 6 carbon atoms, and about 30–0.05 weight percent of at least one monomer selected from the group consisting of polymerizable cyclic ethylenically unsaturated carboxylic acids and carboxylic acid anhydrides.

4. A graft copolymer of about 70–99.95 weight percent of a terpolymer of ethylene, propylene and up to 5% of a member of the group consisting of cyclic and acyclic aliphatic dienes and mixtures thereof, and about 30–0.05 weight percent of at least one monomer selected from the group consisting of polymerizable cyclic ethylenically unsaturated carboxylic acids and carboxylic acid anhydrides.

5. A graft copolymer of about 70–99.95 weight percent of a blend of ethylene polymers, ethylene-alpha-olefin copolymers and ethylene-propylene-diene terpolymers, and about 30–0.05 weight percent of at least one monomer selected from the group consisting of polymerizable cyclic ethylenically unsaturated carboxylic acids and carboxylic acid anhydrides.

6. A graft copolymer of about 70–99.95 weight percent of a blend of ethylene polymers and ethylene-alpha-olefin copolymers, and about 30–0.05 weight percent of at least one monomer selected from the group consisting of polymerizable cyclic ethylenically unsaturated carboxylic acids and carboxylic acid anhydrides.

7. A graft copolymer of about 70–99.95 weight percent of a polyethylene polymer and about 30–0.05 weight percent of at least one monomer comprising 4-methylcyclohex-4-ene-1,2-dicarboxylic acid anhydride.

8. A graft copolymer of about 70–99.95 weight percent of a blend of ethylene polymers and ethylene-propylene-diene terpolymers, and about 30–0.05 weight percent of at least one monomer selected from the group consisting of polymerizable cyclic ethylenically unsaturated carboxylic acids and carboxylic acid anhydrides.

9. A graft copolymer of about 70–99.95 weight percent of a polyethylene polymer and about 30–0.05 weight percent of at least one monomer comprising tetrahydrophthalic anhydride.

10. A graft copolymer of about 70–99.95 weight percent of a polyolefin and about 30–0.05 weight percent of at least one monomer comprising x-methylnorborn-5-ene-2,3-dicarboxylic anhydride.

11. A graft copolymer of about 70–99.95 weight percent of a polyolefin and about 30–0.05 weight percent of at least one monomer comprising norborn-5-ene-2,3-dicarboxylic anhydride.

12. A graft copolymer of about 70–99.95 weight percent of a polyolefin and about 30–0.05 weight percent of at least one monomer comprising 2-cyclopentenyl acetic acid.

13. A graft copolymer of about 70–99.95 weight percent of a polyolefin comprising polyethylene and about 30–0.05 weight percent of at least one monomer comprising abietic acid.

14. A graft copolymer of about 70–99.95 weight percent of a polyolefin and about 30–0.05 weight percent of at least one monomer comprising maleo-pimaric acid.

15. A graft copolymer of about 70–99.95 weight percent of a polyolefin and about 30–0.05 weight percent of at least one monomer comprising bicyclo[2.2.2]oct-5-ene-2,3-dicarboxylic anhydride.

* * * * *